United States Patent [19]

Koyama

[11] Patent Number: 5,894,505
[45] Date of Patent: Apr. 13, 1999

[54] TELEPHONE ANSWERING MACHINE

[75] Inventor: Mitsuhiro Koyama, Higashi Hiroshima, Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/795,291

[22] Filed: Feb. 4, 1997

[30] Foreign Application Priority Data

| Apr. 3, 1996 | [JP] | Japan | 8-081460 |
| May 23, 1996 | [JP] | Japan | 8-128519 |

[51] Int. Cl.$^6$ .................................................. H04M 1/64
[52] U.S. Cl. .................. 379/67.1; 379/70; 379/76; 379/82; 379/85; 379/88.07; 379/88.18; 379/88.23; 379/88.26
[58] Field of Search .................. 379/67, 88, 89, 379/67.1, 70, 76, 82, 85, 88.07, 88.18, 88.23, 88.26

[56] References Cited

U.S. PATENT DOCUMENTS

| 4,782,510 | 11/1988 | Szlam | 379/88 |
| 4,942,598 | 7/1990 | Davis | 379/57 |
| 5,283,818 | 2/1994 | Klausner et al. | 379/67 |
| 5,400,393 | 3/1995 | Knuth et al. | 379/88 |

FOREIGN PATENT DOCUMENTS

| 3-53740 | 3/1991 | Japan. |
| 3-83441 | 4/1991 | Japan. |
| 4-68741 | 3/1992 | Japan. |
| 4-126433 | 4/1992 | Japan. |
| 4-274652 | 9/1993 | Japan. |

*Primary Examiner*—Fan S. Tsang
*Assistant Examiner*—Allan Hoosain
*Attorney, Agent, or Firm*—Nixon & Vanderhye, P.C.

[57] ABSTRACT

In a telephone answering machine, when the calling party information reception unit receives calling party information, and the call detection circuit detects a receiving signal, the main control unit makes the line interface capture the communication line and generate a communication path to the calling party telephone. The main control unit then determines whether the memory has the same calling party information that has been received by the calling party information reception unit. When it has been judged in the negative, the main control unit makes the response message output unit output the first response message. When it has been judged in the affirmative, the main control unit makes the response message output unit output the second response message. Under the direction of the main control unit, the response message output unit outputs the first response message or the second response message to the calling party telephone through the communication path which is generated by the line interface 2. As the result, the telephone answering machine identifies a large amount of calling party information, records a large number of messages, and allows the called party to listen to the messages without trouble.

19 Claims, 11 Drawing Sheets

FIG. 5A

| CALLING PARTY NUMBER AREA | AREA OF NUMBER OF RECEPTION TIMES |
|---|---|
| ○○○○○○○○ | 1 |
|  |  |
|  |  |
|  |  |
|  |  |
|  |  |
|  |  |
|  |  |

FIG. 5B

| CALLING PARTY NUMBER AREA | AREA OF NUMBER OF RECEPTION TIMES |
|---|---|
| ○○○○○○○○ | 2 |
| △△△△△△△△ | 1 |
|  |  |
|  |  |
|  |  |
|  |  |
|  |  |
|  |  |

FIG. 5C

| CALLING PARTY NUMBER AREA | AREA OF NUMBER OF RECEPTION TIMES |
|---|---|
| ○○○○○○○○ | 3 |
| △△△△△△△△ | 1 |
| ◇◇◇◇◇◇◇◇ | 2 |
|  |  |
|  |  |
|  |  |
|  |  |
|  |  |

FIG. 7A

| CALLING PARTY NUMBER AREA (11a) | RECORDING NUMBER AREA (11b) | | | |
|---|---|---|---|---|
| ○○○○○○○○ | 1 | : | : | ... |
| | | : | : | : |
| | | : | : | : |
| | | : | : | : |
| | | : | : | : |
| | | : | : | : |
| | | : | : | : |

FIG. 7B

| CALLING PARTY NUMBER AREA (11a) | RECORDING NUMBER AREA (11b) | | | |
|---|---|---|---|---|
| ○○○○○○○○ | 1 | : | : | ... |
| △△△△△△△△ | 2 | : | : | : |
| | | : | : | : |
| | | : | : | : |
| | | : | : | : |
| | | : | : | : |
| | | : | : | : |

FIG. 7C

| CALLING PARTY NUMBER AREA (11a) | RECORDING NUMBER AREA (11b) | | | |
|---|---|---|---|---|
| ○○○○○○○○ | 1 | : | : | ... |
| △△△△△△△△ | 3 | : | : | : |
| | | : | : | : |
| | | : | : | : |
| | | : | : | : |
| | | : | : | : |
| | | : | : | : |

FIG. 8A

| RECORDING NUMBER AREA | AUDIO DATA AREA |
|---|---|
| 1 | "PLEASE CALL ME IMMEDIATELY." |
| | |
| | |
| | |
| | |
| | |
| | |

| RECORDING NUMBER AREA | AUDIO DATA AREA |
|---|---|
| 1 | "PLEASE CALL ME IMMEDIATELY." |
| 2 | "I WILL CALL YOU AGAIN." |
| | |
| | |
| | |
| | |
| | |

FIG. 8C

| RECORDING NUMBER AREA | AUDIO DATA AREA |
|---|---|
| 1 | "PLEASE CALL ME IMMEDIATELY." |
| 2 | "I WILL CALL YOU AGAIN." |
| 3 | "PLEASE CALL ME." |
| | |
| | |
| | |
| | |

FIG. 10A

| CALLING PARTY NUMBER AREA (11a) | RECORDING NUMBER AREA (11b) | | | |
|---|---|---|---|---|
| ○○○○○○○○ | 1 | | | ... |
| | | | | |
| | | | | |
| | | | | |
| | | | | |

FIG. 10B

| CALLING PARTY NUMBER AREA | RECORDING NUMBER AREA | | | |
|---|---|---|---|---|
| ○○○○○○○○ | 1 | | | ... |
| △△△△△△△△ | 2 | | | |
| | | | | |
| | | | | |
| | | | | |

FIG. 10C

| CALLING PARTY NUMBER AREA | RECORDING NUMBER AREA | | | |
|---|---|---|---|---|
| ○○○○○○○○ | 1 | 3 | | ... |
| △△△△△△△△ | 2 | | | |
| | | | | |
| | | | | |
| | | | | |

FIG. 10D

| CALLING PARTY NUMBER AREA | RECORDING NUMBER AREA | | | |
|---|---|---|---|---|
| ○○○○○○○○ | 1 | 3 | | ... |
| △△△△△△△△ | 2 | 4 | | |
| | | | | |
| | | | | |
| | | | | |

FIG. 10E

| CALLING PARTY NUMBER AREA | RECORDING NUMBER AREA | | | |
|---|---|---|---|---|
| ○○○○○○○○ | 1 | 3 | 5 | ... |
| △△△△△△△△ | 2 | 4 | | |
| | | | | |
| | | | | |
| | | | | |

FIG. 11A

| RECORDING NUMBER AREA | AUDIO DATA AREA |
|---|---|
| 1 | "PLEASE CALL ME." |
|  |  |
|  |  |
|  |  |
|  |  |

| RECORDING NUMBER AREA | AUDIO DATA AREA |
|---|---|
| 1 | "PLEASE CALL ME." |
| 2 | "HAVE YOU SEEN MY DOG, POCHI?" |
|  |  |
|  |  |
|  |  |

FIG. 11C

| RECORDING NUMBER AREA | AUDIO DATA AREA |
|---|---|
| 1 | "PLEASE CALL ME." |
| 2 | "HAVE YOU SEEN MY DOG, POCHI?" |
| 3 | "PLEASE CALL ME IMMEDIATELY." |
|  |  |
|  |  |

FIG. 11D

| RECORDING NUMBER AREA | AUDIO DATA AREA |
|---|---|
| 1 | "PLEASE CALL ME." |
| 2 | "HAVE YOU SEEN MY DOG, POCHI?" |
| 3 | "PLEASE CALL ME IMMEDIATELY." |
| 4 | "I HAVE FOUND POCHI." |
|  |  |

FIG. 11E

| RECORDING NUMBER AREA | AUDIO DATA AREA |
|---|---|
| 1 | "PLEASE CALL ME." |
| 2 | "HAVE YOU SEEN MY DOG, POCHI?" |
| 3 | "PLEASE CALL ME IMMEDIATELY." |
| 4 | "I HAVE FOUND POCHI." |
| 5 | "PLEASE CALL ME AS SOON AS YOU RETURN." |

TELEPHONE ANSWERING MACHINE

BACKGROUND OF THE INVENTION

1. Field of the Invention

The present invention relates to a telephone answering machine.

2. Description of the Related Art

Prior art telephone answering machines are connected to communication lines such as ISDN (Integrated Service Digital Network) or a general public network which is supposed to be inaugurated in a couple of years. The ISDN is a high-capacity high-speed data transmission system which allows a called party to be informed of calling party information including calling party telephone numbers when the data is transmitted. The general public network, on the other hand, allows a called party to be informed of the calling party information when the data is received. These conventional telephone answering machines automatically catch a communication line in response to a receiving signal which is sent from the communication line, and transmit a response message to the communication line. When the transmission of the response message is completed, some of the conventional telephone answering machines record a message from the calling party which is sent through the communication line, and others do not record the message. Another conventional telephone answering machine stores calling party information which is reported when the data is either transmitted or received, thereby identifying each calling party who called during the called party's absence.

However, these conventional telephone answering machines have the following two drawbacks. When a calling party calls the called party's telephone more than once, the calling party information is stored every time and all the messages of the same calling party are recorded. This wastes the capacity of a semi-conductor memory which stores calling party information and records calling parties' messages, or the capacity of a magnetic tape which records calling parties' messages. Consequently, the amount of calling party information to be stored and the number of messages to be recorded are limited. In addition, calling parties' messages are played back in the order in which they are recorded, so that when several messages from the same calling party are recorded with interruption of a message of another calling party, it is troublesome for the called party to understand all the messages.

SUMMARY OF THE INVENTION

In view of these problems, an object of the invention is to provide a telephone answering machine which identifies a large amount of calling party information, records a large number of messages, and allows the called party to listen to the messages without trouble.

In order to achieve the object, the invention provides a telephone answering machine which is connected to a communication line through which calling party information comes when a call incomes, automatically catches the communication line in response to a call incoming signal which is sent from the communication line, at the same time transmits a response message to the communication line, and thereafter records a calling party's message which is sent through the communication line, the telephone answering machine comprising:

receiving means for receiving calling party information;
storing means for storing the calling party information which has been received by the receiving means;
comparing means for comparing the calling party information which has been received by the receiving means with the calling party information which has been stored in the storing means; and
controlling means for varying a response operation of the telephone answering machine, depending on a comparison result of the comparing means.

According to the invention, when the receiving means receives calling party information from the communication line, the comparing means compares the calling party information with the calling party information that is stored in the storing means. The controlling means varies the response operation of the telephone answering machine, depending on the comparison results of the comparing means. On the other hand, the storing means stores the calling party information which is received by the receiving means. Consequently, the response operation for the same calling party can be appropriately selected.

As explained hereinbefore, in the telephone answering machine of the invention, when calling party information which is sent from the communication line is the same as that is already stored, the response operation to the calling party telephone is changed. The appropriate setting of the response operation makes it possible to prevent the same calling party from receiving the same response message every time, and to prevent the recording of the same messages of the same calling party.

The invention is characterized in that the storing means stores the calling party information which is received by the receiving means and the number of calling party information reception times incremented in response to each calling party information, and the controlling means varies a response message to be sent to the communication line, depending on the number of calling party information reception times, when it is detected on the basis of the comparison result of the comparing means that the calling party information which has been stored in the storing means and the calling party information which has been received by the receiving means coincide with each other.

According to the invention, when the receiving means receives calling party information from the communication line, the storing means stores the calling party information in association with the number of times the calling party information was received. The comparing means compares the calling party information which is stored in the storing means with the calling party information which has been received by the receiving means. The controlling means inquires of the storing means about the number of reception times corresponding to the calling party information coincident between the received one and stored one on the basis of results of the comparison, and varies the contents of the response message depending on the number of reception times. Consequently, the response message to respond to a call from the same calling party can be selected appropriately.

As mentioned above, the storing means is such structured that the number of reception times is stored, and therefore, advantageously a large memory capacity is not required. When the calling party information is stored every time of reception, a larger capacity memory is required for storing such calling party information. The invention can solve this problem.

According to the telephone answering machine of the invention, in the case where calling party information sent from the communication line coincides with that already stored, the response operation to the calling party telephone is changed. This appropriate setting of the response operation makes it possible to prevent the same calling party from receiving the same response message every time, and to prevent the called party from listening to the same message of the same calling party.

In the telephone answering machine of the invention, the storing means is structured such that the number of reception times is incremented and stored, so that the capacity of the storing means can be reduced.

The invention is characterized in that when it is detected on the basis of the comparison result of the comparing means that the calling party information which is stored in the storing means coincides with the calling party information which has been received by the receiving means, the controlling means prevents the calling party's message from being recorded.

According to the telephone answering machine of the invention, when the receiving means receives calling party information from the communication line, the comparing means compares the calling party information with the calling party information which is stored in the storing means. When it is detected on the basis of a comparison result of the comparing means that these two pieces of calling party information coincide with each other, the controlling means prevents the message which corresponds to the calling party information from being recorded. On the other hand, the storing means stores the calling party information which is received by the receiving means. Consequently, whether each message from the same calling party should be recorded or not can be properly determined.

In the telephone answering machine of the invention, when calling party information sent from the communication line is the same as that already stored, the recording of the message of the calling party is prevented. Since the recording of the same messages from the same calling party is prevented, the waste of the capacity of the recording medium is prevented and more messages can be recorded.

The invention is characterized in that the storing means stores the stored calling party information and the calling party's message which was recorded when the calling party information was received, in correspondence with each other, and when it is detected on the basis of the comparison result of the comparing means that the calling party information which is stored in the storing means coincides with the calling party information which has been received by the receiving means, the controlling means erases the former message which was recorded when the calling party information was previously received, and allows the storing means to store the calling party's message newly received.

According to the telephone answering machine of the invention, when the receiving means receives calling party information from the communication line, the storing means stores the calling party information and associates the calling party information with a corresponding message which was recorded when the calling party information was received. The comparing means compares the calling party information which has been received by the receiving means with the calling party information is stored in the storing means. When it is detected on the basis of a comparison result of the comparing means that these two pieces of calling party information coincide with each other, the controlling means erases the former message which was recorded when the calling party information was previously received. Consequently, repeated recordings of the same message from the same calling party are prevented.

According to the telephone answering machine of the invention, when calling party information sent from the communication line is the same as that is already stored, the former message of the calling party is erased and a new message is recorded. Consequently, the recording of similar messages of the same calling party can be avoided and the latest message can be recorded. As a result, the waste of the capacity of the recording medium is prevented and more messages are recorded. In addition, real-time messages are recorded.

The invention is characterized in that the telephone answering machine further comprises means for detecting an operation signal which is sent from the communication line, and when it is detected on the basis of a comparison result of the comparing means that the calling party information which is stored in the storing means coincides with the calling party information which has been received by the receiving means, and when the operation detecting means detects a predetermined operation signal, the controlling means erases the former message which was recorded when the calling party information was previously received.

According to the telephone answering machine of the invention, when the receiving means receives calling party information from the communication line, the storing means stores the calling party information and associates the calling party information with a corresponding message which was recorded when the calling party information was received. The comparing means compares the calling party information which has been received by the receiving means with the calling party information which is stored in the storing means. When it is detected on the basis of a comparison result of the comparing means that these two pieces of calling party information coincide with each other and when the operation detecting means detects the predetermined operation signal, the controlling means erases the former message which was recorded when the calling party information was previously received. Consequently, the repeated recording of the same message from the same calling party are prevented.

According to the invention, when calling party information sent from the communication line is the same as that is already stored, the former message of the calling party is erased and a new message is recorded. Since the calling party is allowed to erase the former message by their own operation, the calling party can determine whether to erase the former message, depending to the situation. Thus, the recording of similar messages of the same calling party can be avoided, so that the waste of the capacity of the recording medium is prevented and more messages are recorded. In addition, it is possible to record real-time messages and all the important messages.

The invention is characterized in that when it is detected on the basis of the comparison result of the comparing means that the calling party information which is stored in the storing means coincides with the calling party information which has been received by the receiving means, the controlling means prevents the storing means from storing the calling information.

According to the telephone answering machine of the invention, when the receiving means receives calling party information from the communication line, the comparing means compares the calling party information with the calling party information which is stored in the storing means. The controlling means varies the response operation depending on the comparison results of the comparing means. When it is detected on the basis of the comparison result that these two pieces of calling party information coincide with each other, the controlling means prevents the storing means from storing the calling party information.

Consequently, the response operation to the same calling party can be selected appropriately, and the multiple storage of the same calling party information is prevented.

According to the telephone answering machine of the invention, when calling party information sent from the communication line is not the same as that is already stored, the calling party information is stored. On the other hand, when the calling party information is the same as that is already stored, the calling party information is not stored. Consequently, the redundant recording of the same calling party information can be avoided and the waste of the capacity of the recording medium is prevented and more messages are recorded.

The invention provides a telephone answering machine which is connected to a communication line through which calling party information comes when a call incomes, automatically catches the communication line in response to a call incoming signal which is sent from the communication line, at the same time transmits a response message to the communication line, and thereafter records a calling party's message which is sent through the communication line, the telephone answering machine comprising:

receiving means for receiving calling party information;

storing means for storing the calling party information which has been received by the receiving means and for associating the calling party information with a message which was recorded when the calling party information was received; and message playing back means for successively playing back the messages which correspond to the calling party information which is stored in the storing means.

According to the telephone answering machine of the invention, when the receiving means receives calling party information from the communication line, the storing means stores the calling party information and associates the calling party information with a corresponding message which was recorded when the calling party information was received. The message playing back means successively plays back the messages corresponding to the calling party information which is stored in the storing means. Consequently, the called party can successively listen to the messages from the same calling party.

According to the telephone answering machine of the invention, each calling party information which comes from the communication line is associated with the message of the calling party. Consequently, all the messages from the same calling party can be played back successively, and the called party can listen to the messages without being interrupted by a message from another calling party.

The invention provides a telephone answering machine which is connected to a communication line through which calling party information comes when a call incomes, the telephone answering machine comprising:

receiving means for receiving calling party information;

storing means for storing the calling party information which has been received by the receiving means; and controlling means for preventing the storing means from storing the calling party information when the receiving means can not receive the calling party information.

According to the telephone answering machine of the invention, when the receiving means cannot not receive calling party information, the controlling means prevents the storing means from storing the calling party information. Consequently, to store noise is prevented.

According to the telephone answering machine of the invention, when the calling party information coming from the communication line is successfully received and the calling party information is not the same as already stored, the calling party information is stored. On the other hand, when the calling party information is not successfully received, the calling party information is not stored. Since the calling party information of an unidentified calling party is prevented from being recorded by a transmission avoidance operation, the waste of the capacity of the recording medium is prevented and more messages are recorded.

The invention provides a telephone answering machine which is connected to a communication line through which calling party information comes when a call incomes, the telephone answering machine comprising:

receiving means for receiving calling party information;

storing means for storing the calling party information which has been received by the receiving means; and controlling means for preventing the storing means from storing the calling party information when the reception means can not identify the calling party based on the received calling party information.

According to the telephone answering machine of the invention, when the receiving means receives calling party information, and cannot identify the calling party, the controlling means prevents the storing means from storing the calling party information. Consequently, the storage of the calling party information which is sent from a public phone or an unknown calling party is prevented.

According to the telephone answering machine of the invention, when the calling party information coming from the communication line is successfully received and the calling party information is not the same as already stored, the calling party information is stored. On the other hand, when the calling party cannot be identified by the calling party information coming from the communication line, the calling party information is not stored. Consequently, it is avoided to store the calling party information whose sender cannot be identified because the calling party used a public phone. As a result, the waste of the capacity of the recording medium is prevented and more messages are recorded.

The invention provides a telephone answering machine which is connected to a communication line through which calling party information comes when a call incomes, the telephone answering machine comprising:

receiving means for receiving calling party information;

storing means for storing the calling party information which has been received by the receiving means;

comparing means for comparing the calling party information which is stored in the storing means with the calling party information which has been received by the receiving means; and controlling means for preventing the storing means from storing the calling party information only when it is detected on the basis of a comparison result of the comparing means that the calling party information which is stored in the storing means coincides with the calling party information which has been received by the receiving means.

According to the telephone answering machine of the invention, when the receiving means receives calling party information, the comparing means compares the calling party information with the calling party information which is stored in the storing means. When it is detected on the basis of a comparison result of the comparing means that these two pieces of calling party information coincide with each other, the controlling means prevents the storing means from storing the calling party information. Consequently, the multiple storage of the same calling party information is prevented.

According to the telephone answering machine of the invention, when the calling party information coming from the communication line is successfully received and the calling party information is not the same as already stored, the calling party information is stored. On the other hand, when the calling party information is the same as already stored, the calling party information is not stored. Consequently, multiple recording of the same calling party information is prevented, and as a result, the waste of the capacity of the recording medium is prevented and more messages are recorded.

The invention is characterized in that handset detection means for detecting that a handset has been picked up is provided, and when the coincidence has been detected and the handset has been picked up in response to an output of the handset detection means, the controlling means erases the number of reception times and the calling party's message corresponding to the calling party information, which are stored in the storing means.

The invention is characterized in that handset detection means for detecting that a handset has been picked up is provided;

when the coincidence has been detected, the controlling means increments the number of times of calling party information reception and allow the storing means to store the incremented number as well as the calling party's message; and when the coincidence has been detected and the handset has been picked up in response to an output of the handset detection means, the controlling means erases the number of reception times and the calling party's message corresponding to the calling party information, which are stored in the storing means.

According to the telephone answering machine of the invention, in the case where an automatic answering function is canceled, when an operator of the telephone answering machine at the called party side picks up the handset in response to a calling operation such as calling tone to bring the telephone answering machine into off hook state, when the calling party coincides with the calling party information stored in the storing means, the number of reception times and the calling party message which were stored in the storing means during the operator's absence are automatically erased. Thereby, when the automatic answering function is set again, the storing capacity of the storing means can be effectively utilized for the automatic answering function newly set with the result of saving of memory capacity.

According to the telephone answering machine of the invention, in the case where the automatic answering function is canceled, when the operator picks up the handset, the number of reception times and the calling party's message which are stored in the storing means during the operator's absence are automatically erased. Accordingly, when the automatic answering function is set again, the storing capacity of the storing means can be effectively utilized with the result that enhancement of storing capacity is not necessary.

The invention is characterized in that the storing means is composed of a semiconductor.

According to the telephone answering machine of the invention, the storing means is a semiconductor memory, and accordingly the memory capacity is small as compared with that of magnetic tape. Particularly, the invention can be efficiently embodied notably in the case where such a semiconductor memory having a relatively small memory capacity is provided as the storing means.

BRIEF DESCRIPTION OF THE DRAWINGS

Other and further objects, features, and advantages of the invention will be more explicit from the following detailed description taken with reference to the drawings wherein:

FIGS. 5A–5C are diagrams which show the data configuration of the memory of the telephone answering machine of the second embodiment of the invention;

FIGS. 7A–7C are diagrams which show the data configuration of the memory of the telephone answering machine of the third embodiment of the invention;

FIGS. 8A–8C are diagrams which show the data configuration of the message record/playback unit of the telephone answering machine of the third embodiment of the invention;

FIGS. 10A–10E are diagrams which show the data configuration of the memory of the telephone answering machine of the fourth embodiment of the invention;

FIGS. 11A–11E are diagrams which show the data configuration of the message record/playback unit of the telephone answering machine of the fourth embodiment of the invention.

DETAILED DESCRIPTION OF THE PREFERRED EMBODIMENTS

Figure 1:
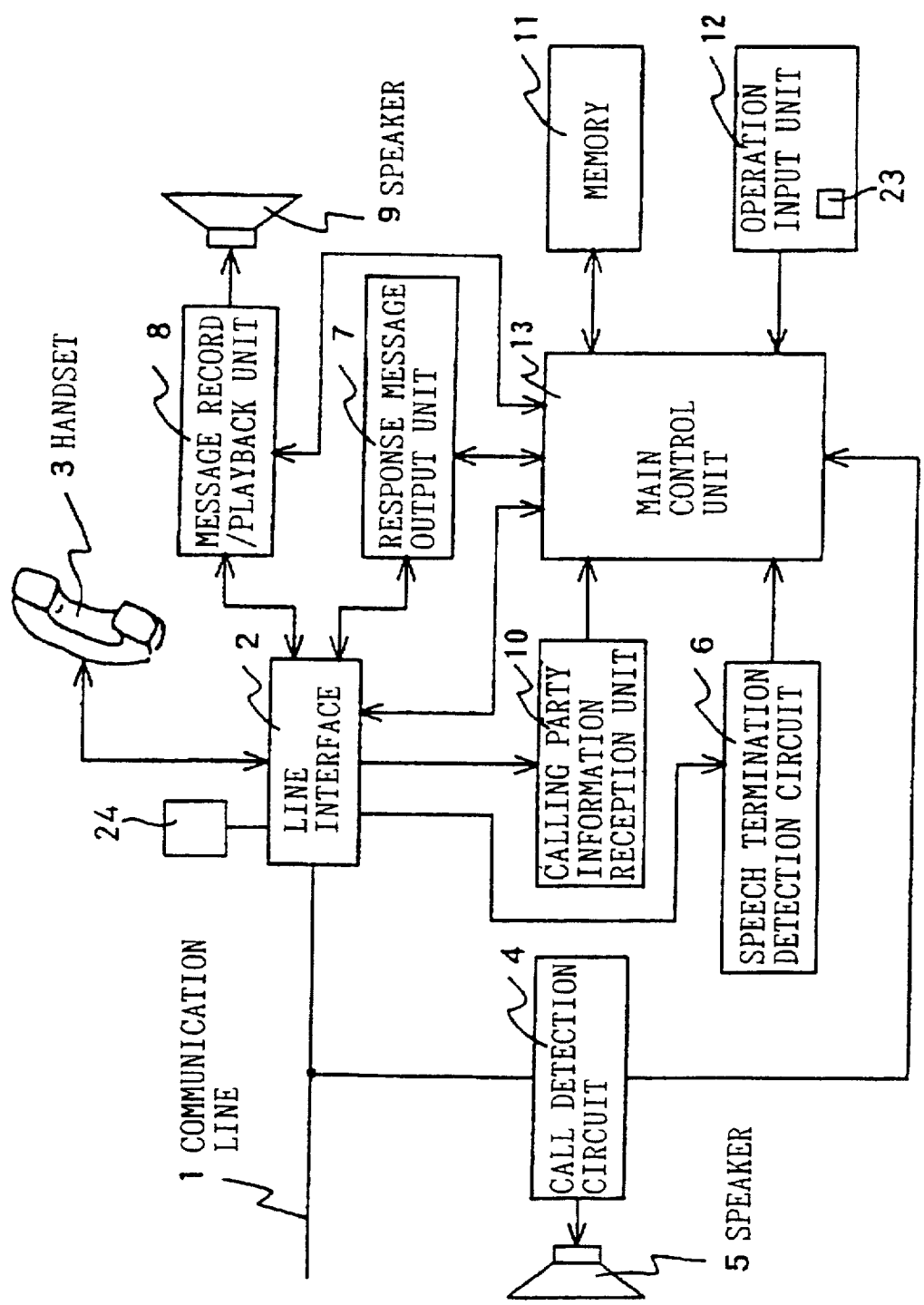
FIG. 1 is a block diagram which shows the electric configuration of the telephone answering machine of the first embodiment of the invention.

Now referring to the drawings, preferred embodiments of the invention are described below.

<FIRST EMBODIMENT>

A first embodiment of the invention will be detailed as follows with reference to FIGS. 1 to 4.

In FIG. 1, reference numeral 1 denotes a communication line which is connected with a telephone machine of a call originating side via an exchange (not shown). Reference numeral 2 depicts a line interface for controlling connection and release operations of the communication line 1 and generating a speech path with the telephone machine of the call originating side connected via the connected communication line 1. Reference numeral 3 depicts a handset which is used to talk with the telephone of the call originating side via the communication path that has been generated by the line interface 2. Reference numeral 4 depicts a call detection circuit for detecting a call from the call originating side by detecting a polarity reverse of the communication line 1 and detecting a call incoming signal which comes from the communication line 1. Reference numeral 5 depicts a speaker for producing a beep sound in response to the detection of the call incoming signal by the call detection circuit 4. Reference numeral 6 depicts a speech termination detection circuit for detecting a speech termination signal such as a busy tone which comes from the communication circuit 1.

Reference numeral 7 denotes a response message output unit for outputting a previously registered response message to the call originating side telephone machine via the communication path which has been generated by the interface. Reference numeral 8 depicts a message record/playback unit for recording a message which is transmitted from the call originating side telephone via the communication path which is generated by the interface 2, erasing and playing back the recorded message. Reference numeral 9 depicts a speaker for giving off the message which is played back by the message record/playback unit 8.

Reference numeral 10 denotes a calling party information reception unit for receiving calling party information from the communication line 1 through the communication path which is generated by the line interface 2. Reference numeral 11 depicts denotes a memory for storing the calling party information which is received by the calling party information reception unit 10 and also storing information such as the number of times that the calling party information was received, information on whether a message has been recorded or not, and information on a position in the message record/playback unit 8 where a message is recorded, in association with the calling party information.

Reference numeral 12 denotes an operation input unit.12 which is composed of function keys which include an absence setting button which sets the start/release of the absence mode, and a message playback button which directs the playback of the calling party message, and numeral keys which are used to input calling subscriber numbers etc. Reference numeral 13 denotes a main control unit 13 for controlling the detecting operation of the call detection circuit 4, the response message output of the response message output unit 7, the connection/release operation of the line interface 2 on the basis of instructions from the operation input unit 12, the playback operation of the response message playback unit 7, the message record/erase/playback operations of the message record/playback unit 8, and the data write/read operations of the memory 11.

Figures 2, 3:
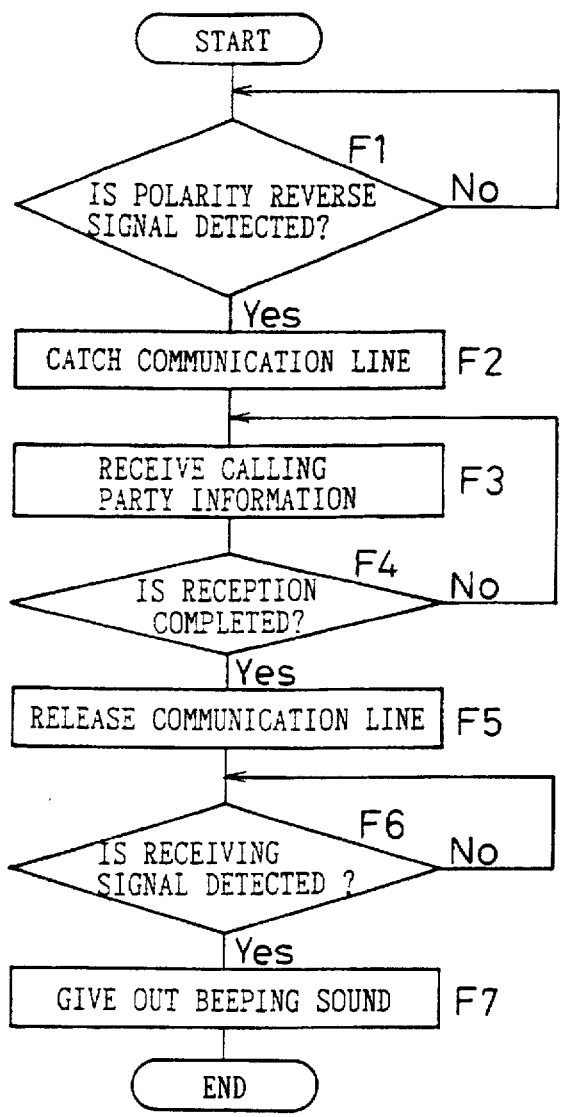
FIG. 2 is a flowchart which depicts the call receiving operation of the telephone answering machine of FIG. 1.
FIG. 3 is a diagram which shows the data configuration of the memory of the telephone answering machine of the first embodiment of the invention.

As shown in FIG. 3 the memory 11 is composed of a calling party telephone number area 11a and a recorded message presence/absence information area 11b. The calling party telephone number area 11a stores calling party telephone numbers included in the calling party information which is received by the calling party information reception unit 10. The recorded message presence/absence information area 11b stores information on whether a calling party's message has been recorded.

The operation input unit 12 is provided with an automatic answering function on/off switch 23 which is operated to activate the automatic answering function of the telephone answering machine during operator's absence of the called party side. When the operator of the called party side is not absent, the automatic answering function is canceled by operating the switch 23. A handset detection means 24 detects that the machine has been brought into hook off state by picking up the handset 3 in the state of automatic answering function canceled, and an output showing the hook off state of the machine is supplied to the main control unit 13.

In the telephone answering machine having a structure described above, on the called party side, setting of an operation for attaining the automatic answering function is executed by operation of the automatic answering function on/off switch 23. When a calling party calls the telephone answering machine, the unillustrated exchange transmits a polarity reverse signal to the telephone answering machine via the communication line 1. The polarity reverse signal indicates that the transmission of the calling party information has been started. The exchange also transmits the calling party information of the calling party via the communication line 1 when the capture of the communication line 1 by the telephone answering machine is detected. Later, when the release of the communication line 1 is detected, the exchange transmits a receiving signal (calling signal) to the telephone answering machine via the communication line 1, thereby informing the telephone answering machine of the calling party information and producing a beep sound. On the other hand, as shown in the flowchart of FIG. 2, in the telephone answering machine, when the call detection circuit 4 detects a polarity reverse signal which comes from the communication line 1 (Step F1), the main control unit 13 makes the line interface 2 capture the communication line 1 (Step F2). Then, the main control unit 13 generates a communication path to the exchange which is connected to the communication line 1 so as to make the calling party information reception unit 10 receive calling party information from the exchange through the communication line 1 (Step F3). When the reception of the calling party information is completed (Step F4), the main control unit 13 makes the line interface 2 releases the communication line 1 (Step F5). When the call detection circuit 4 detects a receiving signal which is sent from the exchange through the communication line 1 (Step F6), the speaker 5 produces a receiving beep (Step F7).

Figure 4:
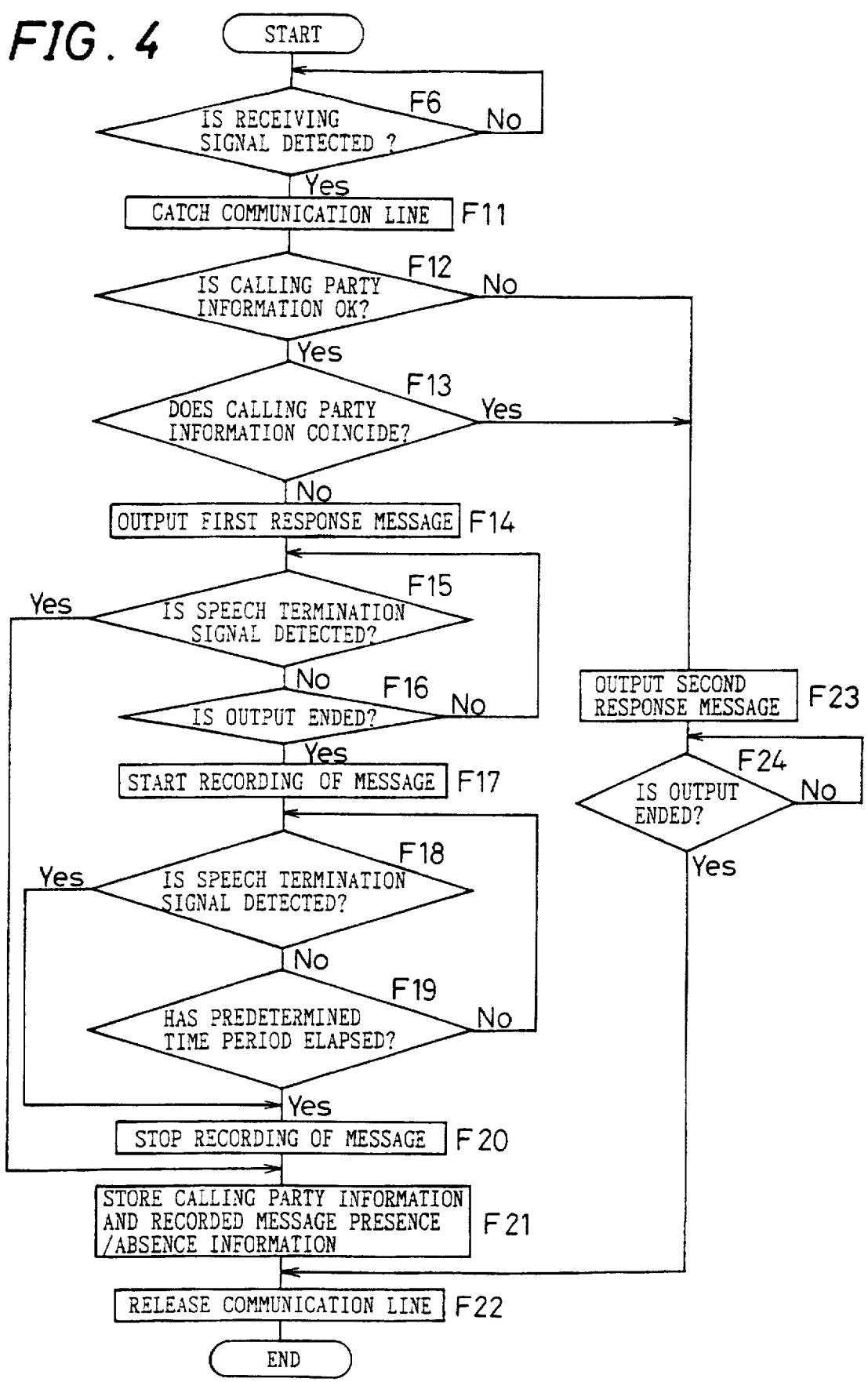
FIG. 4 is a flowchart which depicts the responding operation of the telephone answering machine of the first embodiment of the invention.

The following is a description on the response operation of the telephone answering machine with the above-explained construction with reference to FIGS. 2 and 4.

While the operation input unit 12 is put in the absence mode, when the calling party information reception unit 10 receives calling party information through the above-explained receiving operation (Step F3), and when the call detection circuit 4 detects the receiving signal (Step F6), the main control unit 13 makes the line interface 2 capture the communication line 1 thereby generating a communication path to the calling party telephone (Step F11). The main control unit 13 then checks whether the calling party information reception unit 10 has successfully received the calling party information or the calling party can be identified from the calling party information (Step F12). When it has been judged that the reception of the calling party information has been successful or the calling party can be identified, the main control unit 13 determines whether the same calling party information is already stored in the memory 11 (Step F13).

When it has been judged that the same calling party information is not stored in the memory 11 (Step F13), the main control unit 13 makes the response message output unit 7 output a first response message such as "I am away right now. Please leave a message." to suggest the calling party to leave a message (Step F14). The response message output unit 7 outputs the first response message to the calling party telephone through the communication path under the direction of the main control unit 13. When the output of the first response message is completed (Step F16), the main control unit 13 makes the message record/playback unit 8 record a calling party's message (Step F17). When the speech termination detection circuit 6 detects the disconnection of the call in the calling party telephone while the calling party's message is being recorded (Step F18), or when a predetermined time period passes (Step F19), the main control unit 13 makes the message record/playback unit 8 terminate the recording of the message (Step F20).

When the recording of the message is completed (Step F20), or when the speech termination detection circuit 6 detects the call disconnection in the calling party telephone while the first response message is being outputted (Step F15), the main control unit 13 makes the memory 11 store the calling party information which has been received by the calling party information reception unit 10 and the presence/absence of a recorded message in association with the calling party information (Step F21). The main control unit 13 further makes the line interface 2 release the communication line 1 (Step F22), and terminates the response operation.

On the other hand, while the line interface 2 is in the process of capturing the communication line 1 or generating the communication path, when the main control unit 13 determines that the calling party information reception unit 10 has not successfully received the calling party information or that the calling party cannot be identified from the calling party information (Step F12), or that the same calling party information as received by the calling party information reception unit 10 is stored in the memory 11 (Step F13), the main control unit 13 makes the response message unit 7 output a second response message which does not request the calling party to leave a message, such as "I am not home now. I will call you back when I return." (Step F23). The response message output unit 7 outputs the second response message to the calling party telephone through the communication path under the direction of the main control unit 13. When the output of the second response message is completed (Step F24), the main control unit 13 makes the line interface 2 release the communication line 1 (Step F22), and terminates the responding operation.

To be more specific, when a calling party whose registered telephone number is ##-###-#### calls the telephone answering machine of the present embodiment for the first time, the first response message is outputted to allow the calling party to leave a message. In the case that the calling party leaves a message, the memory 11 stores "##########" in the calling party telephone number area 11a and "presence" in the recorded message presence/absence information area 11b, respectively, as shown in FIG. 3. Later, in the case that the same calling party calls the telephone answering machine of the present embodiment for the second time, the second response message is outputted. The calling party information and the calling party's message are not recorded this time.

When a calling party whose registered telephone number is $$-$$$$-$$$$ calls the telephone answering machine of the present embodiment for the first time, the first response message is outputted to allow the calling party to leave a message. When the calling party does not leave a message, the memory 11 stores "$$$$$$$$$$" in the calling party telephone number area 11a and "absence" in the recorded message presence/absence information area 11b, respectively, as shown in FIG. 3.

Thus, when the telephone answering machine receives a second call from the same calling party, the response message is changed to prevent the calling party from leaving the same message again, and also prevent the same calling party information from being stored. In addition, when the calling party information is not detected properly, the calling party information is prevented from being stored.

In the present embodiment, when calling party information is not properly detected, the second message is outputted to prevent the recording of a calling party's message, and as a result, the waste of the memory capacity is prevented. However, instead of this, the first response message may be outputted to allow the calling party to leave a message, thereby avoiding to miss an important message.

In the present embodiment, when the calling party information which is received by the calling party information reception unit 10 coincides with the calling party information which is stored in the memory 11, the response message is changed to prevent the recording of a message. However, instead of this, the first response message may be outputted to allow the calling party to leave a message when the recorded message presence/absence information area 11b indicates "absence". In this case, it is better to set the recorded message presence/absence information area 11b at "present" and not to store the calling party information to the memory 11.

<SECOND EMBODIMENT>

A second embodiment of the invention will be described as follows with reference to FIGS. 1, 5A–5C, and 6.

The telephone answering machine of the present embodiment has the same electric configuration as that of the first embodiment except that the memory 11 has a reception times area 11c shown in FIGS. 5A–5C in place of the recorded message presence/absence information area 11b. The reception times area 11c stores the number of times that each calling party whose telephone number was stored in the calling party telephone number area 11a called.

The following is a description of the response operation of the telephone answering machine with the above-explained construction.

Figure 6:
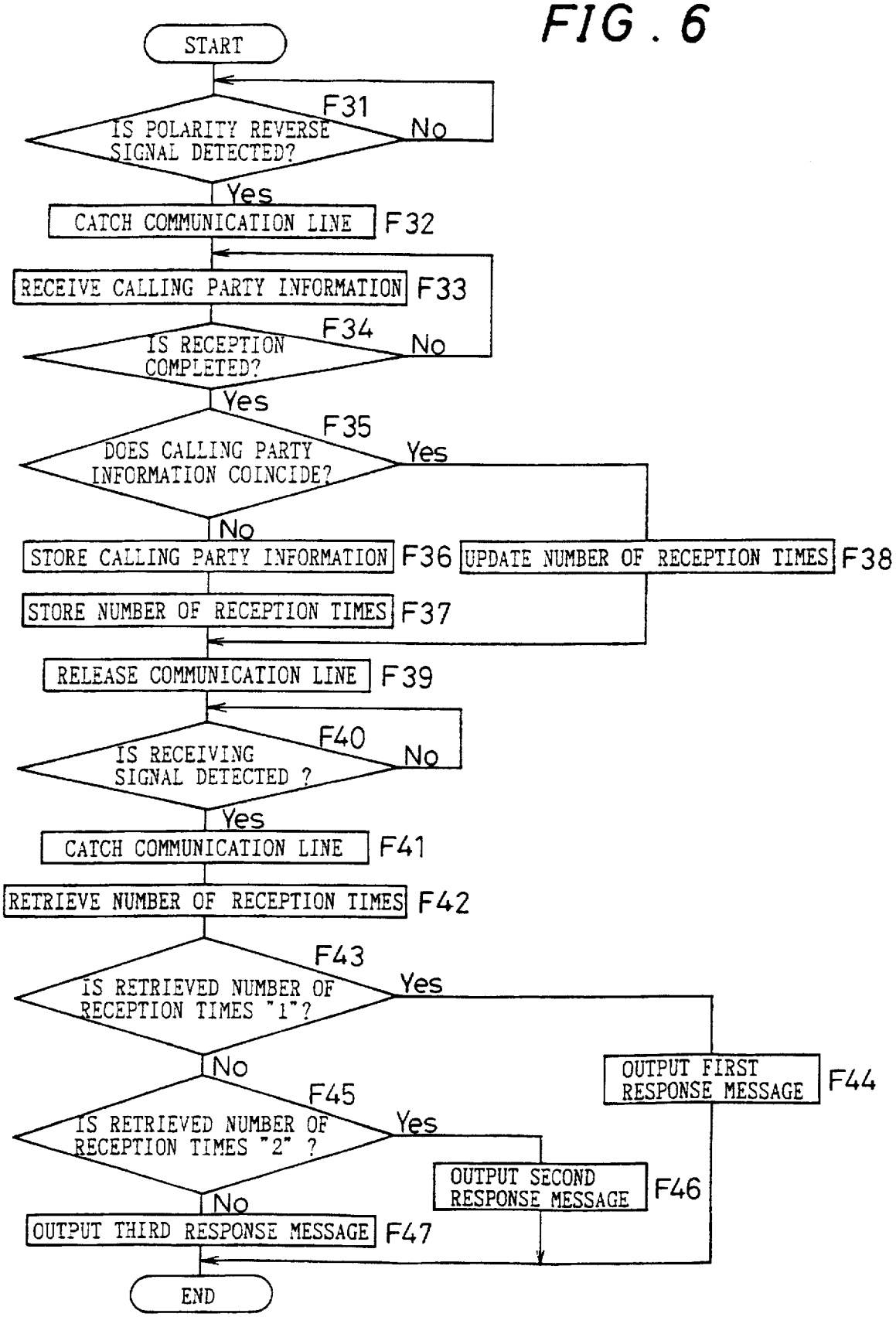
FIG. 6 is a flowchart which depicts the responding operation of the telephone answering machine of the second embodiment of the invention.
Figure 9:
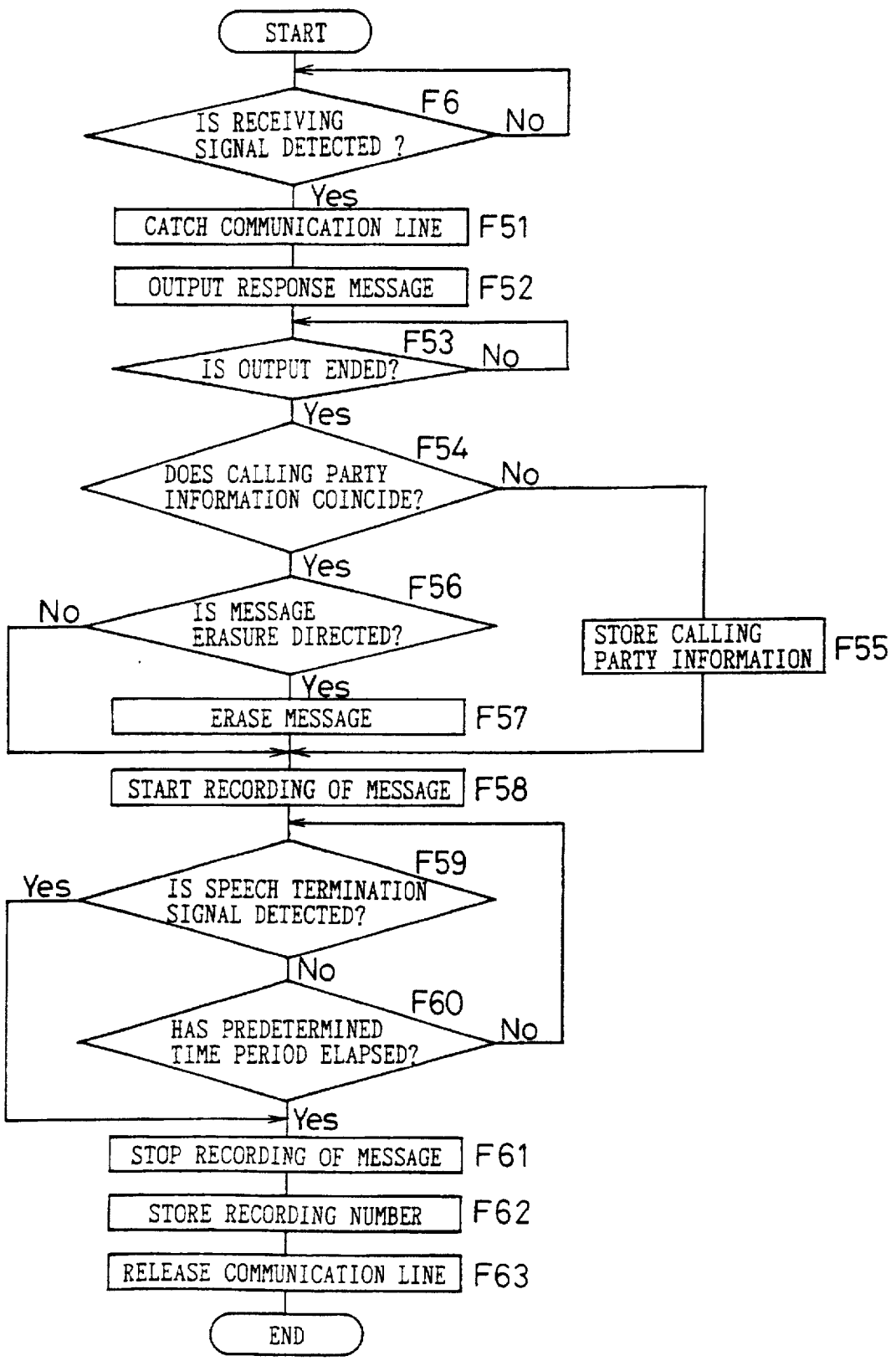
FIG. 9 is a flowchart which depicts the responding operation of the telephone answering machine of the third embodiment of the invention.
Figure 12:
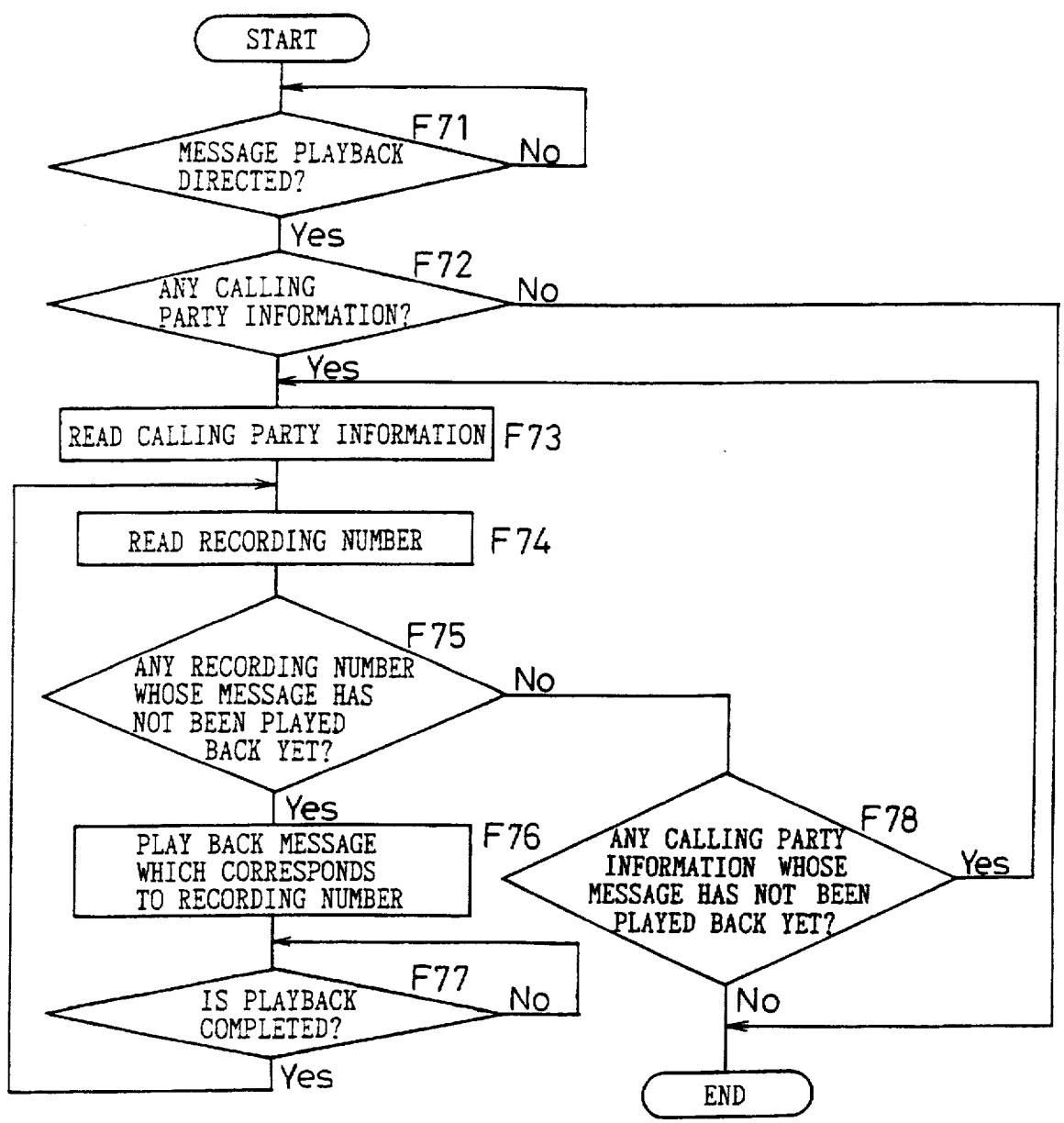
FIG. 12 is a flowchart which depicts the playback operation of the telephone answering machine of the fourth embodiment of the invention.

As shown in the flowchart of FIG. 6, when the call detection circuit 4 detects a polarity reverse signal which comes from the communication line 1 (Step F31), the main control unit 13 makes the line interface 2 capture the communication line 1 (Step F32). The main control unit 13 also makes the line interface 2 generate a communication path to the exchange which is connected to the communication line 1 so that the calling party information reception unit 10 receives calling party information from the exchange through the communication line 1 (Step F33). When the reception of the calling party information is completed (Step F34), the main control unit 13 determines whether the same calling party information is stored in the memory 11 (Step F35).

When has been judged that the memory 11 does not have the same calling party information (Step F35), the main control unit 13 makes the memory 11 store the calling party information which has been received by the calling party information reception unit 10 (Step F36). The main control unit 13 then makes the memory 11 store "1" in the reception times area 11c. The data "1" indicates that this is the first call from the calling party (Step F37). On the other hand, when it has been judged that the memory 11 has the same calling party information (Step F35), the main control unit 13 makes the memory 11 update the number of times that the calling party information was received (Step F38).

After the calling party information and the number of times that the calling party information was received are stored in the memory 11 (Steps F36 and F37), or after the number of times that the calling party information was received is updated (Step F38), the main control unit 13 makes the line interface 2 release the communication line 1 for a time (Step F39). Later, in the case that the operation input unit 12 is in the absence mode, when the call detection circuit 4 detects a receiving signal which is sent from the exchange through the communication line 1 (Step F40), the main control unit 13 makes the line interface 2 capture the communication line 1 and generates a communication path to the calling party telephone (Step F41). The main control unit 13 then retrieves the number of times that the calling party information was received by the calling party information reception unit 10 from the memory 11 (Step F42).

When the main control unit 13 retrieves "1" (Step F43), the main control unit 13 makes the response message output unit 7 output a first response message such as "I am not home now. I will call you back later." (Step F44). When the retrieved number is "2" (Step F45), the main control unit 13 makes the response message output unit 7 output a second response message such as "Thank you for calling me again. I will call you back later." (Step F46). When the retrieved number is neither "1" nor "2" (Step F45), the main control unit 13 makes the response message output unit 7 output a third response message such as "Thank you for calling me again. I will call you back as soon as I return." (Step F47).

In the case that the operation input unit 12 requested the main control unit 13 to announce the calling party information which is stored in the memory 11, the main control unit 13 makes the memory 11 retrieve from the reception times area 11c the number of times that the calling party information was received. The main control unit 13 then reads from the calling party telephone number area 11a the calling party information that corresponds to the largest number. Then, the other calling party information is read in descending order of the number of times, and either displayed in an unillustrated display device or converted into voices to be given off.

To be more specific, when a calling party whose registered telephone number is ##-###-#### calls the telephone answering machine for the first time, the first response message is outputted and "#########" and "1" are stored in the calling party telephone number area 11a and the reception times area 11c, respectively, as shown in FIG. 5A. Later, when the same calling party calls this telephone answering machine for the second time, the second response message is outputted and "2" is written in the corresponding position of the reception times area 11c as shown in FIG. 5B. Later, when the same calling party telephone calls this telephone answering machine for the third time, the third response message is outputted and "3" is written in the corresponding position of the reception times area 11c as shown in FIG. 5C.

In the case that the announcement of the calling party information is requested when the memory 11 has the data shown in FIG. 5C, the telephone numbers "##-###-####", "$$-$$$$-$$$$", and "**--****" are announced in this order.

In the above-explained operation, the number of times that the telephone answering machine responded to a calling party is counted as the number of times that the calling party information was received from the calling party, and the response message is changed depending on the number of times. The order of announcing the stored calling party information can be determined based on the number of times that the calling party information was received from the calling party.

<THIRD EMBODIMENT>

A third embodiment of the invention will be described as follows with reference to FIGS. 1, 2, 7A–7C, 8A–8C, and 9.

The telephone answering machine of the present embodiment has the same electric configuration as that of the first embodiment except that the memory 11 has a recording number area 11b shown in FIGS. 7A–7C instead of the recorded message presence/absence information area 11b shown in FIG. 3, and that the message record/playback unit 8 is composed of a recording number area 8a and an audio data area 8b as shown in FIGS. 8A–8C. The recording number area 11d stores information on the recording position of each message in the message record/playback unit 8. The recording number area 8a indicates the recording position of each recorded message, and the audio data area 8b indicates the contents of each recorded message.

The following is a description of the response operation of the telephone answering machine with the above-explained construction.

Since the operation on receiving a call from a calling party is the same as that of the first embodiment, the explanation is not repeated.

While the operation input unit 12 is put in the absence mode, when the calling party information reception unit 10 receives calling party information through the above-explained receiving operation (Step F3), and when the call detection circuit 4 detects the receiving signal (Step F6), the main control unit 13 makes the line interface 2 capture the communication line 1 to generate a communication path to the calling party telephone (Step F51). The main control unit 13 then makes the response message output unit 7 output a response message such as "I am not home now. Please leave a message." to suggest the calling party to leave a message (Step F52). Under the direction of the main control unit 13, the response message output unit 7 outputs a response message to the calling party telephone through the communication path which is generated by the line interface 2.

When the response message output unit 7 completes the output of the response message (Step F53), the main control unit 13 determines whether the memory 11 has the same calling party information as has been received by the calling party information reception unit 10 (Step F54). When it has been judged that the memory 11 does not have the same calling party information, the main control unit 13 makes the memory 11 store the calling party information which has been received by the calling party information reception unit 10 (Step F55).

On the other hand, when it has been judged that the memory 11 has the same calling party information, the main control unit 13 determines whether the calling party telephone has requested to erase the message by monitoring the DTMF (Dual-Tone Multi-Frequency) signal which comes from the communication line 1 (Step F56). When it has been judged that the calling party telephone requests to erase the message, the main control unit 13 makes the memory 11 erase the former message of the same calling party by erasing the recording number corresponding to the calling party information which has been received by the calling party information reception unit 10 (Step F57).

After the calling party information is stored to the memory 11 (Step F55), after a request for the erasure of a message is not detected (Step F56), or after the message is erased (Step F57), the main control unit 13 makes the message record/playback unit 8 record a message (Step F58). When the speech termination detection circuit 6 detects the disconnection of the calling party telephone, while the message is being recorded (Step F59), or when the predetermined time period has passed (Step F60), the main control unit 13 makes the message record/playback unit 8 terminate the recording of the message (Step F61).

When recording a message, the message record/playback unit 8 records the message in a free position under the direction of the main control unit 13.

When the recording of the message is completed (Step F61), or when the speech termination detection circuit 6 detects the disconnection of the calling party telephone while the first response message is being outputted, the main control unit 13 makes the memory 11 store the recording number in association with the calling party information which has been received by the calling party information reception unit 10 (Step F62). The recording number indicates the recording position of a message. The main control unit 13 then makes the line interface 2 release the communication line 1 (Step F63), to terminate the response operation.

When the operation input unit 12 requests to play back a message, the main control unit 13 makes the memory 11 read calling party information from the calling party telephone number area 11a, under the direction of the operation input unit 12, then makes the unillustrated display device display the calling party information or converts the calling party information into voices to give off. At the same time, the main control unit 13 makes the memory 11 read the recording number which is stored in association with the calling party information from the recording number area 11d. The main control unit 13 identifies the recording position of the message record/playback unit 8, based on the recording number, and makes the message record/playback unit 8 play back the message which corresponds to the calling party information which has been displayed or given off.

To be more specific, suppose that a calling party whose registered telephone number is ##-###-#### calls the telephone answering machine for the first time and leaves a message "Please call me immediately." Then, "#########" and "1" are stored in the calling party telephone number area 11a and the recording number area 11d, respectively as shown in FIG. 7A. At the same time, "1" and "Please call me immediately." are stored in the recording number area 8a and the audio data area 8b, respectively as shown in FIG. 8A.

Later, when a calling party telephone whose registered telephone number is $$-$$$-$$$$ calls the telephone answering machine for the first time and leaves a message "I will call you later.", "$$-$$$-$$$$" and "2" are stored in the calling party telephone number area 11a and the recording number area 11d, respectively as shown in FIG. 7B. At the same time, "2" and "I will call you later." are stored in the recording number area 8a and the audio data area 8b, respectively as shown in FIG. 8B.

Later, when the same calling party whose registered telephone number is $$-$$$-$$$$ calls the telephone answering machine for the second time and leaves a new message "Please call me.", requesting to erase the former message, "3" is stored the recording number area 11d as shown in FIG. 7C. Also, "3" and "Please call me." are stored in the recording number area 8a and the audio data area 8b, respectively as shown in FIG. 8C.

Suppose that the memory 11 has the data shown in FIG. 7C and the message record/playback unit 8 has the data shown in FIG. 8C. In the case that playback of a message is requested, ##-###-#### is announced and the message "Please call me immediately." is given off. $$-$$$-$$$$ is announced and the message "Please call me." is given off.

Thus, in the above-explained operation, a calling party can erase its former message and leave a new message, and a called party can only listen to the message that the calling party wants the called party to listen to.

In the present embodiment, when a calling party calls the telephone answering machine for the second time, its former message is erased when the calling party conducts a message erasing operation. However, instead of this, the former message may be erased automatically when the calling party calls the telephone answering machine for the second time.

<FOURTH EMBODIMENT>

A fourth embodiment of the invention will be described as follows with reference to FIGS. 1, 2, 10A–10E, and 12.

The telephone answering machine of the present embodiment has the same electric configuration as that of the first embodiment except that the memory 11 has the recording number area 11d shown in FIGS. 10A–10E instead of the recorded message presence/absence information area 11b shown in FIG. 3, and that the message record/playback unit 8 is composed of the recording number area 8a and the audio data area 8b as shown in FIGS. 11A–11E.

The responding operation of the telephone answering machine of the present embodiment is the same as that of the first embodiment, so that the explanation is not repeated.

The following is a description on the playback operation for a message which is recorded by the responding operation of the telephone answering machine with the above-explained construction.

When the user of the telephone answering machine operates the operation input unit 12 to play back a message (Step F71), the main control unit 13 determines whether the calling party information is stored in the calling party telephone number area 11a under the direction of the operation input unit 12 (Step F72). When it has been judged that the calling party information is not stored, the main control unit 13 terminates the message playback operation.

Having determined that the calling party information is stored in the memory 11, the main control unit 13 reads out the calling party information from the calling party telephone number area 11a (Step F73), and also reads out the corresponding recording number from the recording number area 11d (Step F74). The main control unit 13 identifies the recording position of the message record/playback unit 8 based on the recording number which is read from the memory 11. The main control unit 13 also makes the message record/playback unit 8 play back the message which is recorded in association with the calling party information which is read from the memory 11 (Step F76).

When the playback of the message is completed (Step F77), the readout operation of the recording number corresponding to the calling party information which is read from the memory 11 and the playback operation of the message corresponding to the recording number are repeated (Steps F74–F77). When the recording numbers corresponding to the calling party information which is read from the memory 11 are all read and the main control unit 13 finds that no more recording numbers to be read are left in the memory 11 (Step F75), the main control unit 13 determines whether the calling party telephone number area 11a has the calling party information whose message has not been played back yet (Step F78).

When the main control unit 13 determines that no calling party information whose message has not been played back yet is left, the playback operation is terminated. On the other hand, when it has been judged that calling party information whose message has not been played back yet is left, the main control unit 13 reads the calling party information, and further reads the recording number corresponding to the calling party information in the same manner as above, and plays back the message corresponding to the recording number. (Steps F73–F77).

When a calling party whose registered telephone number is ##-###-#### calls the telephone answering machine for the first time and leaves a message "Please call me.", "#########" and "1" are stored in the calling party telephone number area 11a and the reception times area 11d, respectively, as shown in FIG. 10A. Also, "1" and "Please call me." are stored in the recording number area 8a and the audio data area 8b, respectively, as shown in FIG. 11A.

Later, when a calling party whose registered telephone number is $$-$$$-$$$$ calls the telephone answering machine for the first time and leaves a message "Have you seen my dog, Pochi?", "$$$$$$$$$" and "2" are stored in the calling party telephone number area 11a and the recording number area 11d, respectively, as shown in FIG. 10B. Also, "2" and "Have you seen my dog, Pochi?" are stored in the recording number area 8a and the audio data area 8b, respectively, as shown in FIG. 11B.

When the calling party whose registered telephone number is ##-###-#### calls the telephone answering machine for the second time and leaves a message "Please call me immediately.", "3" is stored in the recording number area 11d in association with "#########" as shown in FIG. 10C. Also, "3" and "Please call me immediately." are stored in the recording number area 8a and the audio data area 8b, respectively, as shown in FIG. 11C.

Later, when the calling party whose registered telephone number is $$-$$$-$$$$ calls the telephone answering machine for the second time and leaves a message "I have found Pochi.", "4" is stored in the recording number area 11d in association with "$$$$$$$$$" of the calling party telephone number area 11a as shown in FIG. 10D. Also, "4" and "I have found Pochi." are stored in the recording number area 8a and the audio data area 8b, respectively, as shown in FIG. 11D.

When the calling party whose registered telephone number is ##-###-#### calls the telephone answering machine for the third time and leaves a message "Please call me when you return.", "5" is stored in the recording number area 11d in association with "#########" of the calling party telephone number area 11a, as shown in FIG. 10E. Also, "5" and "Please call me when you return." are stored in the recording number area 8a and the audio data area 8b, respectively, as shown in FIG. 11E.

In the case that the memory 11 has the data shown in FIG. 10E and the message record/playback unit 8 has the data shown in FIG. 11E, when the message playback is requested, the messages from the calling party whose telephone number is ##-###-#### are given off successively as "Please call me.", "Please call me immediately.", and "Please call me when you return." After this, the messages from the calling party whose telephone number is $$-$$$-$$$$ are given off as "Have you seen my dog, Pochi?", and "I have found Pochi."

Thus, in the above-explained operation, messages are recorded in association with the calling party information, and as a result, the same calling party's messages can be played back successively.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A telephone answering machine which is connected to a communication line through which calling party information comes when a call incomes, automatically catches the communication line in response to a call incoming signal which is sent from the communication line, at the same time transmits a response message to the communication line, and thereafter records a calling party's message which is sent through the communication line, the telephone answering machine comprising:

receiving means for receiving calling party information;

storing means for storing the calling party information which has been received by the receiving means;

comparing means for comparing, upon establishment of a new connection, the calling party information which has been received by the receiving means with the calling party information which has been stored in the storing means as a result of a calling party message having been recorded for a previous connection for a called party; and controlling means for providing differing pre-recorded response output operations of the telephone answering machine for the same called party depending on a comparison result of the comparing means and by virtue of the fact that the new connection has been established.

2. The telephone answering machine of claim 1, wherein the storing means stores the calling party information which is received by the receiving means and the number of calling party information reception times incremented in response to each calling party information, and the controlling means varies a response message to be sent to the communication line, depending on the number of calling party information reception times, when it is detected on the basis of the comparison result of the comparing means that the calling party information which has been stored in the storing means coincides with the calling party information which has been received by the receiving means.

3. The telephone answering machine of claim 1 or 2, wherein when it is detected on the basis of the comparison result of the comparing means that the calling party information which is stored in the storing means coincides with the calling party information which has been received by the receiving means, the controlling means prevents the calling party's message from being recorded.

4. The telephone answering machine of claim 1 or 2, wherein the storing means stores the stored calling party information and the calling party's message which was recorded when the calling party information was received, in correspondence with each other, and when it is detected on the basis of the comparison result of the comparing means that the calling party information which is stored in the storing means coincides with the calling party information which has been received by the receiving means, the controlling means erases the former message which was recorded when the calling party information was previously received, and allows the storing means to store a calling party's message newly received.

5. The telephone answering machine of claim 4, the telephone answering machine further comprising means for detecting an operation signal which is sent from the communication line, wherein only when it is detected on the basis of the comparison result of the comparing means that the calling party information which is stored in the storing means coincides with the calling party information which has been received by the receiving means, and the operation detecting means detects a predetermined operation signal, the controlling means erases the former message which was recorded when the calling party information was previously received.

6. The telephone answering machine of claim 1 or 2, wherein
when it is detected on the basis of the comparison result of the comparing means that the calling party information which is stored in the storing means coincides with the calling party information which has been received by the receiving means, the controlling means prevents the storing means from storing the calling information.

7. The telephone answering machine of claim 3, the telephone answering machine further comprising handset detection means for detecting that a handset has been picked up, wherein
when the coincidence has been detected and the handset has been picked up in response to an output of the handset detection means, the controlling means erases the number of reception times and the calling party's message corresponding to the calling party information, which are stored in the storing means.

8. The telephone answering machine of claim 1, wherein the storing means is composed of a semiconductor.

9. A telephone answering machine comprising:
a line interface circuit through which calling party information is obtained for incoming telephone calls;
a message playback and recording unit which plays pre-recorded messages in response to otherwise unanswered incoming telephone calls and which records calling party messages which are responsive to the pre-recorded messages;
a memory which stores calling party information for incoming calls for a calling party leaving calling party messages;
a controller operable to search the memory for calling party information upon receipt of an incoming call to a called party and which, upon determining that the calling party has left a calling party message to the same called party during a previous connections, causes the message playback and recording unit to apply a differing pre-recorded message to the calling party during a subsequent incoming call to the same called party.

10. The apparatus of claim 9, wherein after a calling party has left a calling first party message for the same called party, the controller does not permit the calling party to record a calling party second message for the same called party.

11. The apparatus of claim 9, wherein the controller stores in the memory an indication of the number of incoming calls associated with the calling party information, wherein the controller permits the calling party to provide calling party messages in response to each of the differing pre-recorded messages, wherein a count value is stored in the memory in association with each calling party message having the same calling party information; and wherein the controller causes the message playback and recording unit to playback successive calling party messages having the same calling party information, the successive calling party messages being played back in a predetermined order based on the stored count value.

12. The apparatus of claim 11, wherein the predetermined order is one of chronological forward order or chronological reverse order.

13. The apparatus of claim 9, wherein for an incoming call already having calling party information stored in the memory and for which the playback and recording unit records a calling party message, the controller erases an earlier calling party message associated with the calling party information.

14. The apparatus of claim 13, wherein the controller automatically erases an earlier calling party message associated with the calling party information.

15. The apparatus of claim 13, wherein the controller erases an earlier calling party message associated with the calling party information upon receipt of a predetermined signal from the calling party.

16. The apparatus of claim 9, further comprising a handset, and wherein in response to an offhook condition during an incoming call, the controller causes the playback and recording unit to erase any recorded calling party messages associated with the calling party information of the incoming call.

17. A telephone answering machine comprising:
a line interface circuit through which calling party information is obtained for incoming telephone calls;
a message playback and recording unit which plays pre-recorded messages in response to otherwise unanswered incoming telephone calls and which records calling party messages which are responsive to the pre-recorded messages;
a memory which stores calling party information for incoming calls for a calling party leaving calling party messages;
a controller operable to search the memory for calling party information upon receipt of an incoming call and which, upon detection by the controller of an incoming call already having calling party information stored in the memory and for which the playback and recording unit records a new calling party message, erases an earlier calling party message associated with the calling party information.

18. The apparatus of claim 17, wherein the controller automatically erases an earlier calling party message associated with the calling party information.

19. The apparatus of claim 17, wherein the controller erases an earlier calling party message associated with the calling party information upon receipt of a predetermined signal from the calling party.

* * * * *